United States Patent [19]

Hansen et al.

[11] B 3,998,081

[45] Dec. 21, 1976

[54] ELECTROMAGNETIC DENT PULLER

[75] Inventors: Karl A. Hansen; Iver Glen Hendrickson, both of Seattle, Wash.

[73] Assignee: The Boeing Company, Seattle, Wash.

[22] Filed: July 17, 1974

[21] Appl. No.: 489,290

[44] Published under the second Trial Voluntary Protest Program on February 17, 1976 as document No. B 489,290.

[52] U.S. Cl. .............................. 72/56; 29/421 M; 317/151

[51] Int. Cl.$^2$ ....................................... B21D 26/14

[58] Field of Search ................. 72/56, 54, 57, 705; 27/44 M; 317/151

[56] References Cited

UNITED STATES PATENTS

| | | | |
|---|---|---|---|
| 3,196,649 | 7/1965 | Furth | 29/421 M X |
| 3,703,958 | 11/1972 | Kolm | 72/56 |
| 3,704,506 | 12/1975 | Orr | 72/56 |
| 3,810,373 | 5/1974 | Quegrolx | 72/56 |

FOREIGN PATENTS OR APPLICATIONS

| | | | |
|---|---|---|---|
| 2,030,497 | 11/1970 | France | 72/56 |

*Primary Examiner*—Milton S. Mehr
*Attorney, Agent, or Firm*—Morris A. Case; Bernard A. Donahue

[57] ABSTRACT

An apparatus and method of electromagnetically pulling dents from conductive material. A coil is formed to direct an effective electromagnetic coupling to a limited area between the coil and a dented part. A nonconductive mold placed between the coil and part has openings to overlie the dent. The coil is first energized with a slowly rising current then is energized with a fast pulsing countercurrent to generate a strong pulling electromagnetic coupling.

32 Claims, 15 Drawing Figures

ELECTROMAGNETIC DENT PULLER

BACKGROUND OF THE INVENTION

It has long been known to electromagnetically deform or shape a conductive part. The part is placed in a mold which is recessed to allow for deformation of the part, a conductive coil is held adjacent the part and a high energy electric current is introduced in the coil. This generates strong electromagnetic repulsing forces between the part and the coil; which is strong enough to push the part into the recess in the mold.

More recently U.S. Pat. No. 3,196,649 disclosed a device for electromagnetic metal-forming by magnetic tension. A slowly rising current in a conductor creates a magnetic field which encompasses a part to be formed and a second conductor. Upon collapse of the current in the first conductor an induced magnetism between the part and the second conductor creates magnetic tension therebetween to form the part.

It is known to use a pulsed electromagnetic field to create magnetic tension between an energized coil and a conductive faced bonded structure to test the bond.

SUMMARY OF THE INVENTION

A working head has an electric conductor or work coil embedded in a nonconductive material. This material has a working surface which is held adjacent a dented conductive part. The coil is located near the working surface and is shaped to concentrate the effective pulling force into the dented area of the part. The pulling force is generated by first introducing a strong, slowly rising pulse of current. This pulse of current seeks to move the part away from the coil. The strong current generates a strong penetrating electromagnetic field, but the slow rate of rise prevents generating a deforming pushing force. A pulsed countercurrent is then introduced into the coil to cancel the first current and generate an electromagnetic coupling seeking to move the coil and the part together. This pulse is rapid to quickly collapse the first current thereby generating a strong tensioning magnetic force to remove the dent by pulling or to push the dent out from behind as it is believed the coupling magnetic force actually pushes the dent from behind. The amplitude of the countercurrent ranges from about 50 to 100 percent of the amplitude of the first current. A nonconductive mold or mask is placed between the part to be worked and the working surface. This mask has an opening which is sized to approximate the area of the dent and of a thickness to permit the material in the dent to be pulled slightly beyond the finished surface so that springback will allow it to conform to the rest of the surface.

It is an object of this invention to provide an apparatus for pulling dents from conductive material.

It is another object of this invention to provide a coil configuration to concentrate effective electromagnetic forces between the coil and a dent in a part.

It is yet another object to provide a mold for placement between a dented part and a working surface to control dent removal quality.

DETAILED DESCRIPTION

Figure 1:
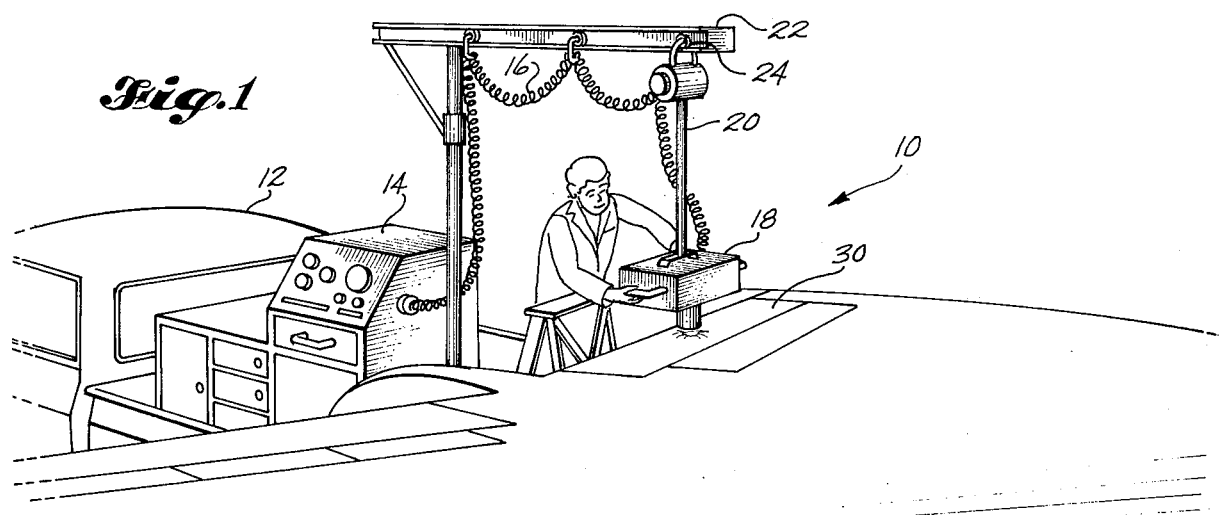
FIG. 1 is a fragmented perspective view of a dent removal apparatus removing a dent from an airplane control surface.

An electromagnetic dent remover 10 will remove dents from a conductive surface with a magnetic pulling force that pulls the bent surface back into contour. In FIG. 1, the dent remover is shown mounted in a truck 12 with energy source and control panel 14, control cable 16 extending from the control panel and working head 18. In this embodiment the working head is supported by arm 20 which in turn is supported from a boom 22 with a movable connection 24 which permits three-dimensional movement of the head. Thus, an operator may position a working surface 26 adjacent to and in alignment with a dent 28 in a conductive material 30 which in this embodiment is a control panel of an airplane. Once the working surface is positioned with respect to the dent in a part a logic system 32 closes switch 34 to fire a bank 36 of capacitors which sends a pulse of current through cable 16a thence conductive coil 38. This sets up an electromagnetic field that extends from the coil through the dented part with repulsing energy seeking to move them apart. If one were to electromagnetically form parts using this repulsing force the capacity should be high and the time of the pulse should be rapid, however, to form by electromagnetic pulling as per this invention, the energy level is high but the pulse is timed to rise slowly to allow the generation of strong lines of force without repulsively deforming the part. The amplitude will vary with type and thickness of the material being straightened and may be determined by previous testing on equivalent materials. A capacitance value of 720 microfarads with an operating voltage of 10 kilovolts and energy storage of 36 kilojoules was used to pull dents from aluminum control surfaces. The time interval ranges from about 0.8 to about 1.6 milliseconds with 1.6 milliseconds preferred. Slower rise rates may be used but introduces a penalty due to the need for cooling the working surface 26. When the slowly rising low frequency current reaches a maximum the logic system 32 closes switch 40 which sends a high frequency rapid current from capacitor 42 through cable 16b thence through coil 38. This second or rapid rising current is 180° out of phase with the first slowly rising current and actually flows countercurrent to the slowly rising current. This opposing fast current pulse then effectively cancels the slow current pulse in the work coil, causing the field to rapidly collapse back toward the coil to pull out the dent by pushing from behind. The magnitude of the rapid pulsed current varies according to the type of material being straightened, and varies from about 50 to 100% of the amplitude of the slowly rising current due to a mirror effect. When straightening aluminum and magnetic steels it should be about 50%, nonmagnetic stainless steel about 80 to 90% and titanium about 90 to 100%. The pulse should be rapid and range from about 10 to 40 microseconds with about 20 to 30 microseconds preferred. At the end of the rapid pulse the logic system closes switch 44 to short out the working coil to ground 46. The bank of capacitors 36 and capacitors 42 each have separate charging units not shown. The banks are isolated from each other by a blocking inductor 48. The logic system controls the timing and the sequencing of the cycle. A single pull cycle may be used to remove a dent or a series of shots or pull cycles may be used to effect a gradual straightening of a dent. On long dents the working head may be progressively moved between pulling cycles to straighten out the surface.

Figure 4A:
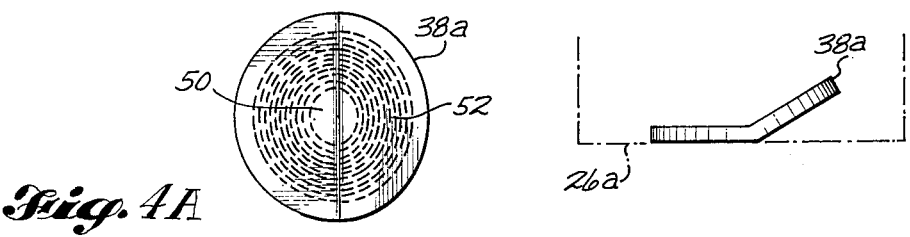
FIGS. 4a, 4b, 4c, 4d, and 4e each show a plan view and a side elevation of a configuration variant for a spirally wound coil used in the working head of FIG. 2.
Figure 4B:
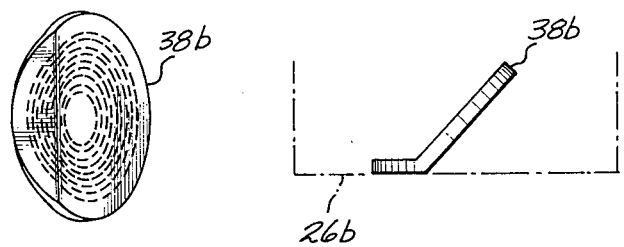
Figure 4C:
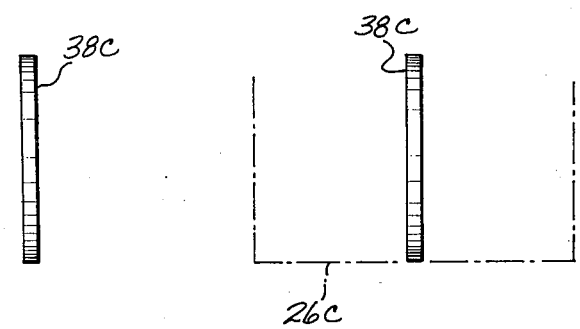
Figure 4D:
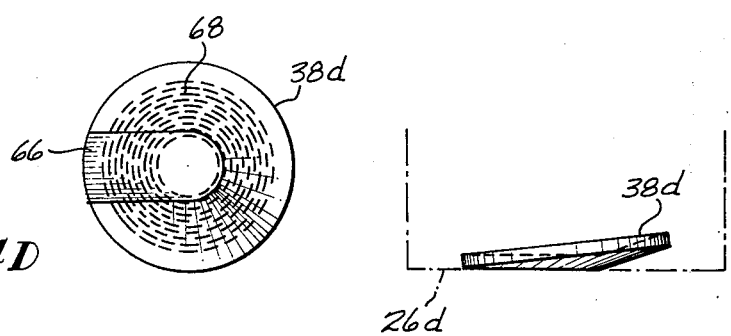
Figure 4E:
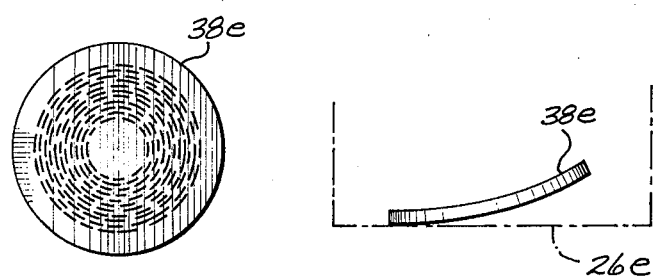
Figure 5:
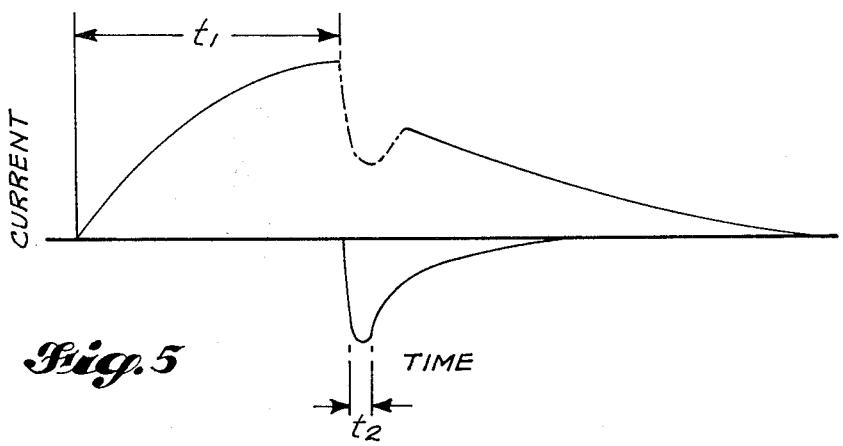
FIG. 5 is a diagram showing the amplitude and time relationship of the combined slow and fast pulses of current through the conductive coil.
Figure 6:
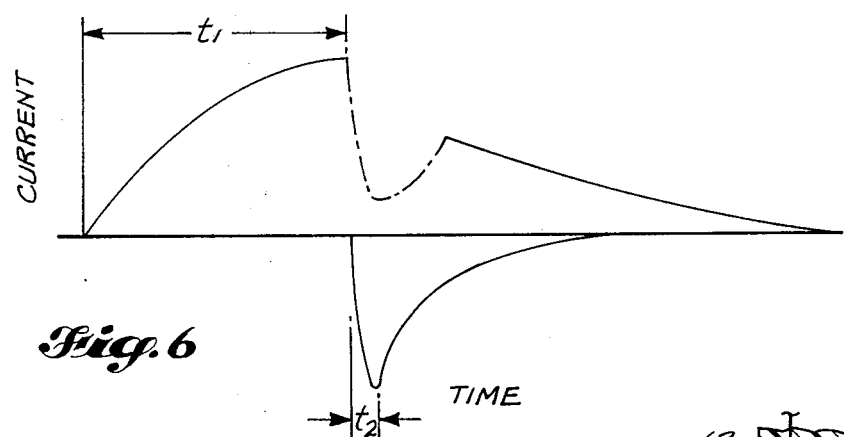
FIG. 6 is a diagram as in FIG. 5 with a different relationship between the two currents.
Figure 9:
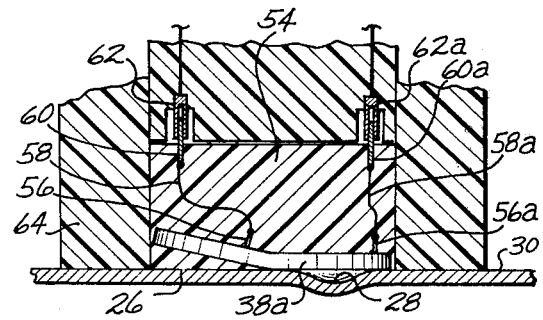
FIG. 9 is a fragmented side elevation sectional view of a working head positioned adjacent a dented part.

The working coil 38 is preferably spiral. FIGS. 4a through 4e show various embodiments of the coil. These coils concentrate the effective coupling lines of force between the coil and the dented area of the work piece or part. Coil 38a has core area 50 and conductive wire, rod or ribbon 52. This conductive material is coated with a nonconductive material. The coil is shaped in two planes subtending an obtuse angle; so that about 50% of the coil lies adjacent to and conforms to working surface 26 and the other 50% extends away from the working surface. The coil 38a, as best shown in FIG. 9, is embedded in nonconductive material to make up a quickly replaceable insert 54. The insert has working surface 26a with coil core connector 56 leading through conductor 58 to electrical plug 60 and coil outer turn connector 56a leading through conductor 58a to electrical plug 60a. The plugs insert into sockets 62 and 62a for quickly connecting or disconnecting into the electrical current. That part of the coil that essentially conforms to the working surface is located directly over the dented area 28 to concentrate the effective lines of force. The insert lies within housing 64 which is made of nonconductive material. The insert is easily changed to permit use of an insert with variations in the shape of the coil to selectively direct lines of force depending on the dent to be removed. In FIG. 4b coil 38b lies in two planes subtending an obtuse angle with about 20% effective area conforming to the working surface 26b. In FIG. 4c the coil 38c is a flat spiral coil lying in a single plane and located within the insert to extend normal to the working surface 26c. In FIG. 4d coil 38d is multi-planer with area 66 in a plane essentially conforming to the shape of working surface 26d and the balance of the coil area 68 extending away from that surface. In FIG. 4e the coil 38e is arcuate shaped with the concave side near one end adjacent the working surface 26e and gradually extending away from that surface. The shape of the coils shown are for example only and are not intended to be limiting. These coils may be readily formed by first winding a coil 38f flat, next placing the coil in a nonconductive mold 68 which has recess 70 shaped to final configuration of coil 38f. The mold has recesses 72 and 72a to allow conductors 74 and 74a, which connect to the core and the outside turn respectively of the coil, to extend through the mold. A conductive material 76 is placed against the mold and when current is applied the repulsive force forms the coil to final configuration.

Figure 2:
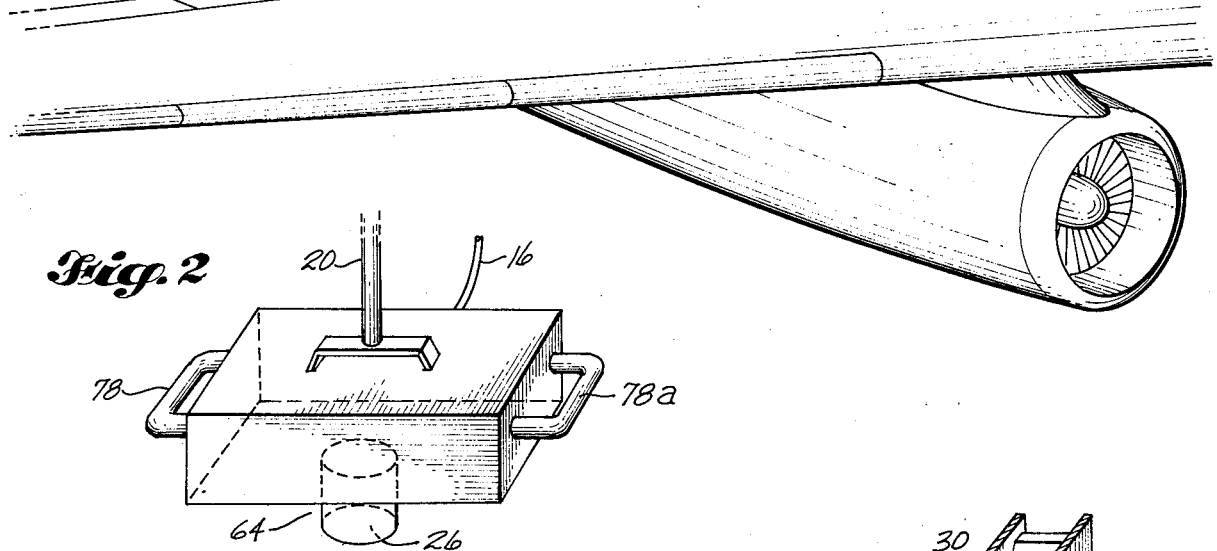
FIG. 2 is a perspective view of the working head of the dent removal apparatus of FIG. 1.
Figure 3:
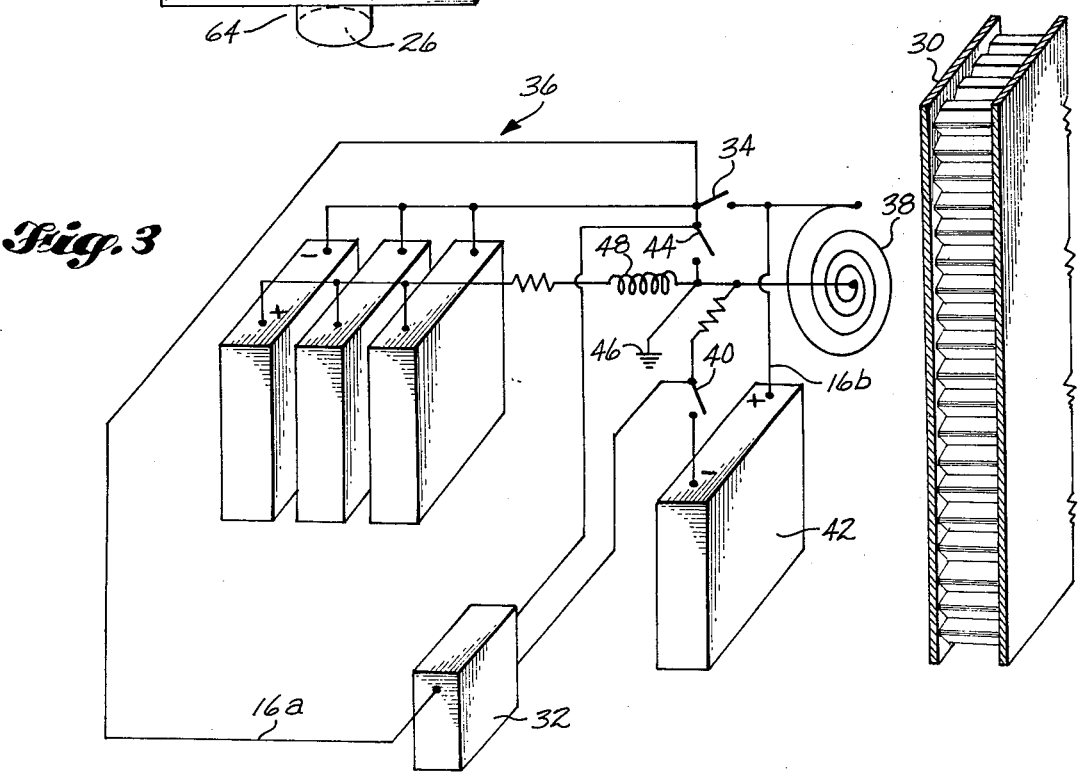
FIG. 3 shows a schematic of the electrical circuit for the apparatus.

The working head 18 (see FIG. 2) does not require supporting arm 20, but may be positioned by an operator using handles 78 and 78a. During the slowly rising current part of the tension forming cycle the working coil and a surface of a part to be straightened repulse each other with force insufficient to deform the part but may require considerable pressure to prevent being pushed apart. When the effective area of the coil is reduced as shown in FIGS. 4a through 4d it reduces the over-all effective repulsing force and makes a portable hand operated working head feasible.

Figure 7:
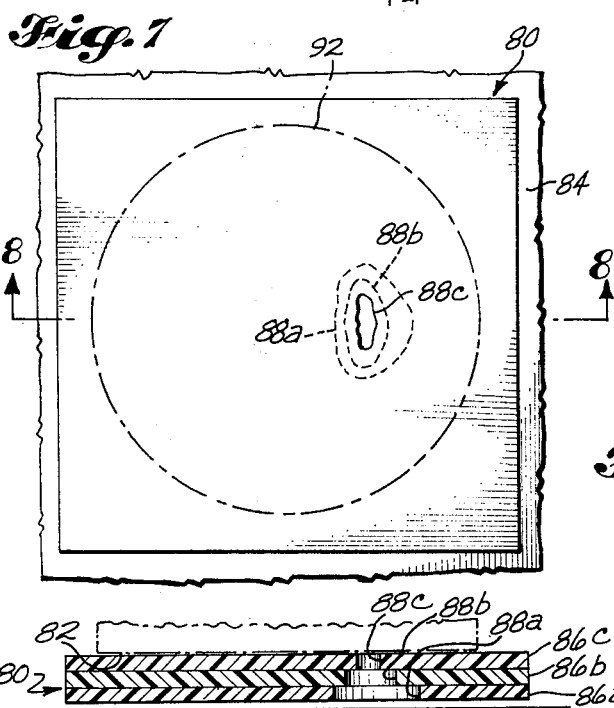
FIG. 7 is a multi-layered nonconductive mold.
Figure 10:
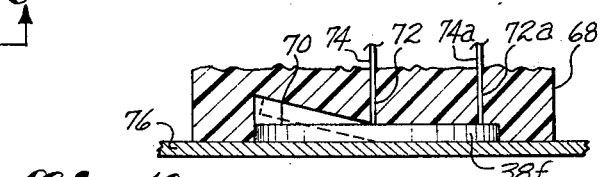
FIG. 10 shows a fragmented sectional view of a mold for forming a working coil.
Figure 8:
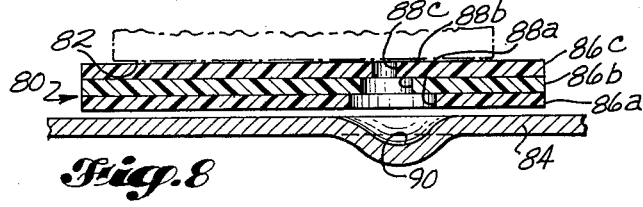
FIG. 8 shows a cross section taken along the lines 8 — 8 of FIG. 7.

FIGS. 7 and 8 show a nonconductive mold or mask 80, that is positioned between working surface 82 and a conductive part 84. In this embodiment the mask is made up of several flat layers 86a, 86b and 86c with each having a respective opening 88a, 88b, and 88c. These openings are located over and approximate the area of dent 90. The openings are progressively larger extending from the dented part or work piece toward the working surface. The mask may be a single layer or multi-layers as shown here and preferably has over-all thickness of about 0.003 to 0.006 inches. The opening permits the dented part to be pulled into the opening and when it springs back a smooth contour is provided. The mask preferably has a line 92 the same shape as working head housing 64 to assist in lining up the working surface.

Figure 11:
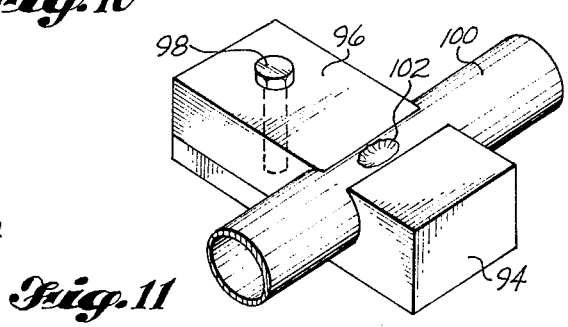
FIG. 11 shows a fragmented perspective view of a fixture holding a dented tube.

The electromagnetic pulling of dents may be used on dented tubing such as is shown in FIG. 11. In that figure a fixture with parts 94 and 96 are joined with bolt 98 to tube 100 having dent 102. The fixture effectively supports the tube while exposing the dent. This fixture should be of nonconductive material, and provides a support to prevent deforming of the walled tubing.

Having described our invention it is apparent to one skilled in the art that various modifications may be made without departing from the spirit of the invention as set out in the following claims.

We claim:

1. An apparatus for electromagnetically removing dents from conductive materials comprising: a conductive coil embedded in a nonconducting material having a working surface positioned adjacent a part having a dent and the coil positioned to couple and concentrate lines of force with the dented part, a nonconductive mold to be positioned between the working surface and the dented part and having an opening formed to approximate at least a portion of an area of the dent to be removed, means for introducing a slowly rising pulsed current through the coil timed to generate a strong electromagnetic field through the part without deforming the part, and means for introducing a rapidly pulsed countercurrent in the coil, said current having an amplitude of at least 50% of the slowly rising current, timed to generate an electromagnetic tensioning force between the coil and the part to remove the dent.

2. An apparatus for electromagnetically removing dents as in claim 1 wherein the nonconductive mold comprises a series of layers of flat stock material each having different size openings with the largest opening adjacent the part.

3. An apparatus for electromagnetically removing dents as in claim 1 further comprising means for concentrating the effective pulling force into the dented area of the part.

4. An apparatus for removing dents as in claim 1 wherein the conductive coil comprises a spiral wound conductor coil embedded in a nonconductive material to form a coil working surface, and at least a portion of the coil conforms and is immediately adjacent to the coil working surface.

5. An apparatus for removing dents as in claim 4 with the spiral coil in multiplanes all but one of which extends away from the coil working surface.

6. An apparatus for removing dents as in claim 4 with the spiral coil extending in two planes subtending an obtuse angle.

7. An apparatus for removing dents as in claim 1 with the conductive coil a spirally wound coil embedded in a nonconductive material to form a coil working surface, said coil in a plane extending away from the coil working surface with an edge of the coil adjacent thereto.

8. An apparatus for removing dents as in claim 7 wherein the coil extends normal to the coil working surface.

9. An apparatus for removing dents as in claim 7 wherein the coil extends at an angle less than 90° from the coil working surface.

10. An apparatus for removing dents as in claim 1 further comprising means for grounding out the coil.

11. An apparatus for removing dents as in claim 10 wherein the countercurrent is about 80% of the slowly rising pulsed current.

12. An apparatus for removing dents as in claim 10 wherein the countercurrent is about 90% of the slowly rising pulsed current.

13. An apparatus for electromagnetically removing dents from a conductive material comprising: a workhead to include a nonconducting material terminating in a working surface, a spiral wound coil embedded in the nonconducting material, said coil shaped and located with respect to the working surface to concentrate an effective electromagnetic coupling between the coil and a dented part; means for introducing a slowly rising current pulse into the coil, said current pulse of a duration to generate a high electromagnetic field without deforming the part; and means for introducing a rapidly rising countercurrent pulse into the coil, said counter current pulse of an amplitude of from about 50 to 100 percent of the slowly rising current pulse and of a duration to cancel the slowly rising current to generate a strong electromagnetic coupling to remove the dent.

14. An apparatus for electromagnetically removing dents from a conductive material comprising: a workhead to include a nonconducting material terminating in a working surface, a spiral wound coil embedded in the nonconducting material, said coil shaped and located with respect to the working surface to concentrate an effective electromagnetic coupling between the coil and a dented part, means for detachably connecting to the embedded coil; means for introducing a slowly rising current pulse into the coil, said current pulse of a duration to generate a high electromagnetic field without deforming the part; and means for introducing a rapidly rising countercurrent pulse into the coil, said countercurrent pulse of an amplitude of from about 50 to 100 percent of the slowly rising current pulse and of a duration to cancel the slowly, rising current to generate a strong electromagnetic coupling to remove the dent.

15. An apparatus for removing dents as in claim 13 wherein the head is portable.

16. An apparatus for removing dents as in claim 13 further comprising: a nonconductive mold to be positioned between the dented part and the head working surface, said mold having an opening of approximately the area of the dent to be removed.

17. An apparatus for removing dents as in claim 13 further comprising a nonconductive mold of several layers of flat stock material to be positioned between the dented part and the head working surface wherein the layers have progressively smaller openings from the part side out.

18. An apparatus for removing dents as in claim 13 wherein the spiral coil extends in multiplanes with one of the planes conforming to the working surface and located adjacent thereto.

19. An apparatus for removing dents as in claim 13 further comprising a nonconductive fixture detachably clamped to a dented tube shaped part to support the tube and expose the dented area.

20. A method of electromagnetically pulling dents from conductive material, the steps comprising: positioning a working surface of a working head of a nonconducting material adjacent a dent in a part; energizing a coil within the head, shaped for electromagnetic coupling to the part, with a slowly rising current; controlling the amplitude and duration of the current for generating a strong electromagnetic field without deforming the part; introducing a countercurrent into the coil; controlling the amplitude of the countercurrent to about 50 to 100 percent of the slowly rising current; and timing the duration of the countercurrent to generate a deforming tensioning magnetic force against the part to remove the dent.

21. A method of electromagnetically pulling dents as in claim 20 with the further steps of: forming a mold of nonconductive material having an opening approximately the shape of the dent, and placing the mold with the opening over the dent in the part prior to positioning the working surface.

22. A method of electromagnetically pulling dents from conductive material wherein the steps comprise: forming a spiral wound coil in multiplanes, embedding the coil in a nonconductive material forming a working head, locating the coil within the material with one plane of the coil adjacent and the other planes extending away from an end of the nonconductive material making up a working surface, forming a nonconductive mold with an opening therethrough, placing the mold over a dented part with the opening covering the dent, positioning the working surface of the working head against the mold with the adjacent plane of the coil opposite the dent, introducing a slowly rising current through the coil, and cancelling the slowly rising current with a rapid pulsed countercurrent through the coil of an amplitude of about 50 to 100 percent of the slowly rising current to generate a electromagnetic coupling to remove the dent.

23. A method of electromagnetically pulling dents from conductive material as in claim 22 with the further step of shorting the coil to ground at the end of the rapid pulse.

24. An apparatus for removing dents as in claim 14 wherein the head is portable.

25. An apparatus for removing dents as in claim 14 further comprising: a nonconductive mold to be positioned between the dented part and the head working surface, said mold having an opening of approximately the area of the dent to be removed.

26. An apparatus for removing dents as in claim 14 further comprising a nonconductive mold of several layers of flat stock material to be positioned between the dented part and the head working surface wherein the layers have progressively smaller openings from the part side out.

27. An apparatus for removing dents as in claim 14 wherein the spiral coil extends in multiplanes with one of the planes conforming to the working surface and located adjacent thereto.

28. An apparatus for removing dents as in claim 14 with the spiral coil extending in two planes subtending an obtuse angle.

29. An apparatus for removing dents as in claim 14 with the spiral coil in a plane extending away from the coil working surface with an edge of the coil adjacent thereto.

30. An apparatus for removing dents as in claim 29 wherein the coil extends normal to the coil working surface.

31. An apparatus for removing dents as in claim 29 wherein the coil extends at an angle less than 90 degrees from the coil working surface.

32. An apparatus for removing dents as in claim 14 further comprising means for grounding out the coil.

* * * * *